United States Patent Office 3,376,235
Patented Apr. 2, 1968

3,376,235
SULFONATED p-POLYPHENYL
Robert J. Hartle, Gibsonia, Pa., assignor to Gulf Research & Development Company, Pittsburgh, Pa., a corporation of Delaware
No Drawing. Filed Nov. 26, 1965, Ser. No. 510,069
2 Claims. (Cl. 260—2.2)

ABSTRACT OF THE DISCLOSURE

Sulfonated p-polyphenyl which is useful as an ion exchange resin is represented by the formula

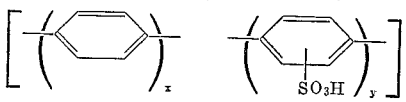

where $x$ is an integer of about 50 to about 100, $y$ is an integer of about 10 to about 20, the sum of $x$ and $y$ is about 60 to about 120, the ratio of $x$ to $y$ is about 5:1 to about 10:1 and the sulfo-containing benzene rings are randomly dispersed in the chain.

---

This invention relates to a novel sulfonated p-polyphenyl which is useful as an ion exchange resin and to a method for its preparation.

The principle of ion exchange has been used for many years in water conditioning. Ion exchange is becoming increasingly important in purifying pharmaceuticals, recovering metals from aqueous solutions thereof, sugar refining, food processing, catalyzing chemical reactions, and the like. Unfortunately, the use of ion exchange in industry has been restricted to some extent because of the limitations imposed by the physical and chemical characteristics of the ion exchange materials. Siliceous ion exchange materials, for example, are satisfactory for water conditioning but they tend to disintegrate both physically and chemically when used under alkaline or acid conditions. Synthetic phenolic resins obtained by reacting an aldehyde and a phenol have been used as base materials in forming ion exchange resins and these phenolic resins, in general, are more stable than the naturally occurring siliceous materials. While the phenolic resins have certain advantages over the naturally occurring siliceous materials, the phenolic resins because of their low capacity and also their chemical and physical instability have not been widely used commercially. More recently, ion exchange resins have been based upon non-phenolic materials such as copolymers of styrene and divinylbenzene. The use of styrene-divinylbenzene copolymers as a base material for ion exchange resins has led to higher capacity and more durable ion exchange resins but these resins are limited to some extent by the temperature at which they can successfully be employed.

I have discovered that the product obtained by sulfonating p-polyphenyl is highly resistant to attack by organic solvents, inorganic acids, bases and salts, is chemically and physically stable at temperatures up to about 300° C. and is particularly useful as an ion exchange resin.

The p-polyphenyl which is sulfonated in accordance with the invention can be prepared by known chemical procedure. The preparation of p-polyphenyl by the chloranil oxidation of poly-1,3-cyclohexadiene which was obtained by Ziegler polymerization is reported by C. S. Marvel and G. E. Hartzell, Journal American Chemical Society, 81, 448 (1959). The preparation of p-polyphenyl by polymerizing benzene under mild reaction conditions, 30°–40° C., in the presence of an aluminum chloride-cupric chloride-water catalyst system is reported by P. Kovacic and A. Kyriakis, Journal American Chemical Society, 85, 454–458 (1963). An investigation of some of the reaction variables in the polymerization of benzene in an aluminum chloride-cupric chloride catalyst system is reported by P. Kovacic and J. Oziomek, Polymer Preprints-American Chemical Society Division of Polymer Chemistry, 4, No. 2, 57–68 (1963). The polymerization of benzene is believed to proceed in accordance with the equation:

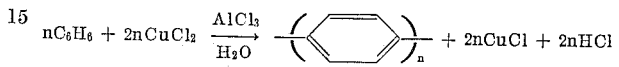

where $n$ is an integer of about 60 to about 120.

p-Polyphenyl is thermally stable at temperatures up to about 500° C. In addition to its high thermal stability, p-polyphenyl is insoluble in organic solvents including boiling chlorobenzene, p-xylene, acetone and alcohol. The extreme insolubility of p-polyphenyl is believed to be due to close-packing of the long, linear chains of the polymer. Infrared spectral data for p-polyhpenyl shows principal absorption in the region of 802–808 cm.$^{-1}$ which is characteristic of para substitution. Less intense absorption maxima at 758–767 cm.$^{-1}$ and 690–697 cm.$^{-1}$ is indicative of mono substitution. The determination of the molecular weight of p-polyphenyl by usual methods is not feasible because of the extreme insolubility of p-polyphenyl in organic solvents. However, an approximate indication of relative molecular weights can be obtained by an examination of the ratio of the intensity of the para band to the intensity of the mono band. As the molecular weight increases, this ratio becomes larger. p-Polyphenyl obtained by polymerizing benzene under mild reaction conditions comprises a linear chain of about 60 to about 120 benzene rings attached in the para positions.

The sulfonation of p-polyphenyl can be conducted with various sulfonating agents such as concentrated sulfuric acid, sulfur trioxide, oleum, etc. Of these reagents, oleum is preferred because of the comparative ease by which the sulfo group, —SO$_2$OH, is introduced into the p-polyphenyl. Sulfonation with oleum can be conducted over a period of 1 to 50 hours or more in the temperature range of about 25° to about 200° C. In general, however, from 1 to 2 sulfo groups for every 10 benzene rings can be incorporated in the p-polyphenyl in about 2 to about 5 hours at about 25° to about 100° C. Upon completion of the sulfonation, the reaction mass is added to water. The solid is then filtered and washed with water until the washings are neutral. The product is then dried. The dried product is sulfonated p-polyphenyl comprising a linear chain of about 60 to about 120 benzene rings attached together in the para positions containing about 1 to about 2 sulfo groups for every 10 benzene rings. Thus, the ratio of unsubstituted benzene rings to sulfo-containing benzene rings in the sulfonated p-polyphenyl product is about 5:1 to about 10:1. The sulfonated p-polyphenyl is believed to have the general formula

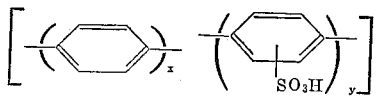

where $x$ is an integer of about 50 to about 100, $y$ is an integer of about 10 to about 20, the sum of $x$ and $y$ is about 60 to about 120 and the ratio of $x$ to $y$ is about 5:1 to about 10:1. While the ratio of unsubstituted benzene rings to sulfonated benzene rings in the sulfonated p-polyphenyl product is about 5:1 to about 10:1, there is no intent to imply that the sulfonated benzene rings necessarily occur at regular intervals in the linear chain of benzene rings. The sulfo groups, for example, can be randomly dispersed in the chain.

The invention may be more fully understood by reference to the following specific embodiments.

Example I.—Preparation of p-polyphenyl

Into a flask equipped with stirrer were placed 78 grams (1 mole) of benzene and 66.5 grams (0.5 mole) of anhydrous aluminum chloride. One milliliter of water was then added with stirring to the contents of the flask. Immediately after the addition of water, 67 grams (0.5 mole) of anhydrous cupric chloride was added with continued stirring. The mixture was then stirred for 30 minutes while maintaining the temperature at about 34° to 39° C. The reaction mixture was then hydrolyzed by adding the mixture to two liters of water. Hydrochloric acid (18%) was added to the aqueous mixture to dissolve aluminum salts. The finely-divided solid which settled out was filtered and washed alternatively with boiling water and boiling concentrated hydrochloric acid until a final washing with the hot water gave washings which were substantially colorless. The solid was then washed with two 100-milliliter portions of hot 10% sodium hydroxide followed by washing with water until the filtrate was free of chloride. The solid product was then dried in an oven at 120° C. to yield 11 grams of p-polyphenyl. The p-polyphenyl product was a finely-divided, light tan solid, insoluble in organic solvents, possessing good thermal stability at temperatures up to 500° C. The yield of p-polyphenyl based on cupric chloride and the equation shown hereinabove was about 58% by weight. No significant amount of chlorine was found in the p-polyphenyl. Neither metals nor their salts were detected in the p-polyphenyl. The infrared spectrum of the product supported the para configuration, with phenyl end groups constituting a minor part of the structure. A strong absorption band occured at 808 cm.$^{-1}$, characteristic of para substitution. Medium absorption bands were obtained at 1480, 1000 and 767 cm.$^{-1}$.

Example II.—Sulfonation of p-polyphenyl

Into a flask equipped with a stirrer and thermometer were placed 2 grams of p-polyphenyl prepared in Example I and 48 grams of fuming sulfuric acid (16% oleum). After an initial temperature rise of 5° to 10° C., the mixture was stirred for 42 hours at 25° C. The mixture was then poured into one liter of water. The solid was then removed on a filter and washed with water until the washings were neutral. The product was then dried in a vacuum over at 48° C. The sulfonated p-polyphenyl product thus obtained was a dark brown powder weighing 2.35 grams. The infrared spectrum of the sulfonated p-polyphenyl showed the characteristic bands of the parent p-polyphenyl together with bands characteristic of sulfonic acid. Strong absorption bands occurred at 808 and 1165 cm.$^{-1}$. Medium absorption bands were obtained at 1480, 1310, 1035 and 1000 cm.$^{-1}$. The sulfonated p-polyphenyl comprises a linear chain of about 60 to about 120 benzene rings attached together in the para positions some of which contain a stably bound sulfo group. There is an average of about one sulfo group for every seven benzene rings.

In order to illustrate the ion exchange capacity of the sulfonated p-polyphenyl, 0.500 gram of the product of Example II was slurried in 100 ml. of water using a magnetic stirrer. Standard potassium hydroxide (0.1 normal) was then aded in 1.0 ml. portions. The pH of the mixture was determined potentiometrically after the addition of each portion allowing sufficient time for the pH to become stabilized. The ion exchange capacity of the sulfonated p-polyphenyl of Example II to retain potassium ions as thus determined was 1.3 milliequivalents of potassium ion per gram of sulfonated p-polyphenyl.

The capacity of the sulfonated p-polyphenyl of Example II to retain sodium ions was also determined. In this determination, a bed of the sulfonated p-polyphenyl was formed by adding a slurry of 1.00 gram of the sulfonated p-polyphenyl to a 7 mm. (inside diameter) Pyrex tube closed at the bottom by a glass wool plug. One gram of the slurried sulfonated p-polyphenyl occupied about 4 cubic centimeters. A 10 ml. portion of 0.2 normal sodium chloride was then passed through the column followed by 50 ml. of water. Retention of the sodium ion was determined by titration of the acid (HCl) in the effluent. The ion exchange capacity of the sulfonated p-polyphenyl of Example II to retain sodium ions as thus determined was 1.1 milliequivalents of sodium ion per gram of sulfonated p-polyphenyl.

Example III.—Sulfonation of p-polyphenyl

In repeating the procedure set forth in Example II, using about 13 to about 40 grams of fuming sulfuric acid (16% oleum) per gram of p-polyphenyl at temperatures of about 25° to about 175° C. for times of about 2 to about 18 hours, sulfonated p-polyphenyl having characteristics substantially the same as those in Example II are obtained. The infrared spectra of the sulfonated p-polyphenyl obtained under these conditions shows the characteristic bands of the parent p-polyphenyl polymer together with the bands characteristic of sulfonic acid. The products are dark brown to black powders containing about 4 to about 6 percent by weight of sulfur. The sulfonated p-polyphenyl obtained under these conditions comprises linear chains of about 60 to about 120 benzene rings containing about.1 to about 2 sulfo groups for every ten benzene rings. The ion exchange capacity of the sulfonated p-polyphenyl products obtained under these conditions ranges from about 1.2 to about 1.8 milliequivalents of potassium ion per gram of sulfonated p-polyphenyl.

In order to illustrate the utility of sulfonated p-polyphenyl still further, an esterification reaction was conducted with and without sulfonated p-polyphenyl as the catalyst. In conducting this evaluation, a solution was formed comprising 50 grams (0.25 mole) of lauric acid, 31 grams (0.30 mole) of n-hexanol and 250 ml. of toluene. The solution was refluxed with stirring in a flask equipped with a Dean-Stark water trap to determine the amount of water formed in the reaction. After refluxing for 4 hours, only about 0.2 ml. of water was collected. Sulfonated p-polyphenyl of Example II (0.46 gram) was then added to the reaction mixture and refluxing continued. During the next two hours, 1.2 ml. of water was evolved and the reaction continued until 85% of the theoretical amount of water was collected. The sulfonated p-polyphenyl was removed from the reaction mixture by filtration. The sulfonated p-polyphenyl thus recovered was chemically and physically unchanged even after prolonged treatment with boiling toluene. The catalytic effect of the sulfonated p-polyphenyl on the esterification reaction is thus readily apparent.

While my invention has been described with reference to various specific examples and embodiments, it will be understood that the invention is not limited to such examples and embodiments and may be variously practiced within the scope of the claims hereinafter made.

I claim:

1. Sulfonated p-polyphenyl which comprises a linear chain of about 60 to about 120 benzene rings attached together in the para positions and containing about 1 to about 2 sulfo groups for every 10 benzene rings.

2. Sulfonated p-polyphenyl having the general formula

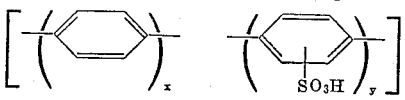

where $x$ is an integer of about 50 to about 100, $y$ is an integer of about 10 to about 20, the sum of $x$ and $y$ is about 60 to about 120, the ratio of $x$ to $y$ is about 5:1 to about 10:1 and the sulfo-containing benzene rings are randomly dispersed in the chain.

References Cited

Kovacic et al.: J. Am. Chem. Soc., 85, 454–458 (1963).
Kunin: Ion Exchange Resins, N.Y., John Wiley & Sons, 1958, (second edition) pp. 82–85.

WILLIAM H. SHORT, *Primary Examiner.*

M. GOLDSTEIN, *Assistant Examiner.*